Feb. 7, 1950 F. G. NICHOLSON 2,496,403
CASTING DEVICE FOR FISHING LINES
Filed March 10, 1948 2 Sheets-Sheet 2
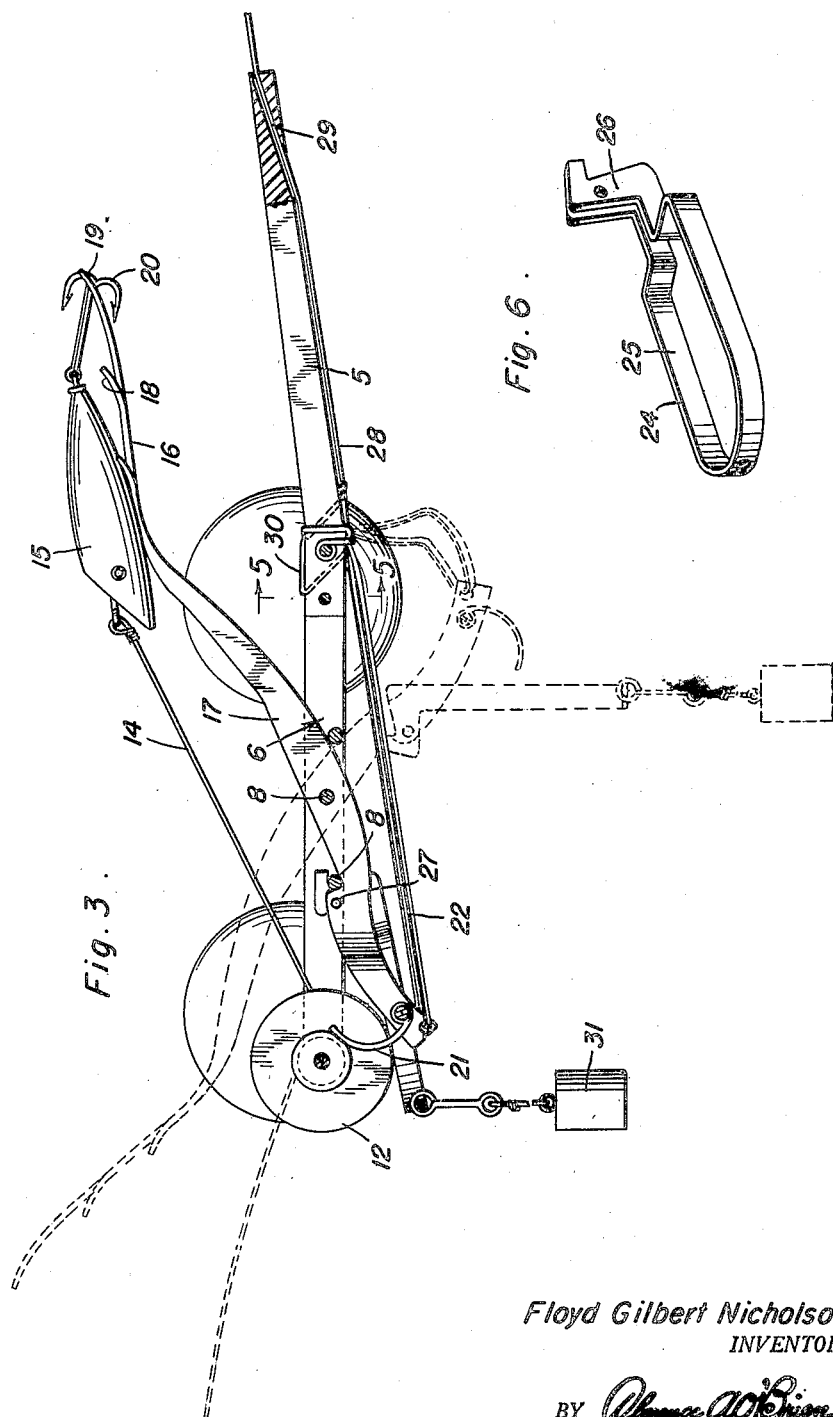
Floyd Gilbert Nicholson
INVENTOR.

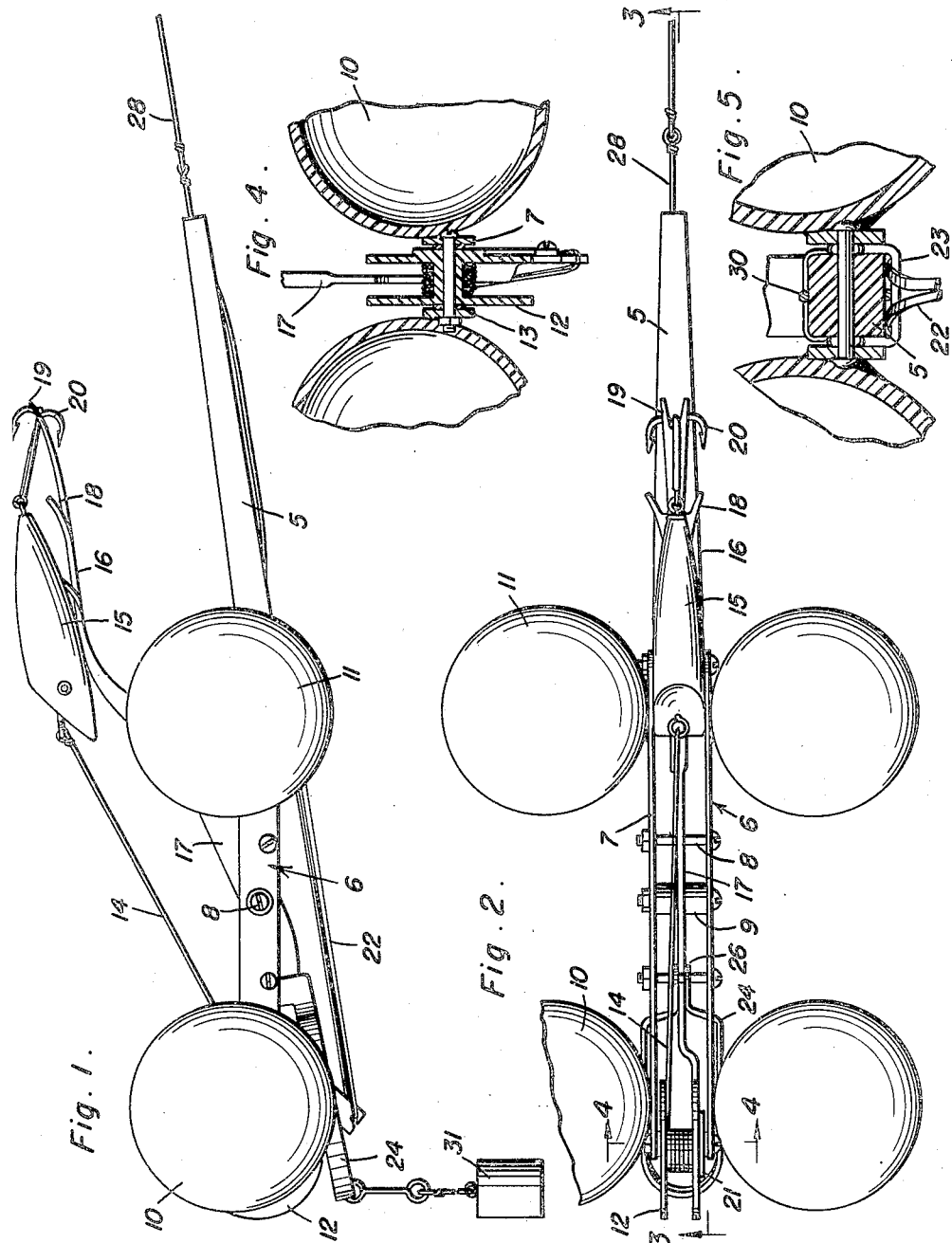

Patented Feb. 7, 1950

2,496,403

UNITED STATES PATENT OFFICE 2,496,403

CASTING DEVICE FOR FISHING LINES

Floyd Gilbert Nicholson, Cambridge, Nebr.

Application March 10, 1948, Serial No. 14,113

7 Claims. (Cl. 43—19)

The present invention relates to new and useful improvements in casting devices for fishing lines whereby the hooks carried by the line may be placed a substantially greater distance out in a body of water than is now possible through the use of the usual casting rods.

An important object of the invention is to provide a fishing line casting device thrown by hand or casting rod out into a body of water and including the provision of a float for supporting the casting device on the surface of the water and a reel carried by the float for holding a fish line with bait attached thereto in a reeled-in position while the device is being cast and automatically releasing the bait for supporting the same below the surface of the water after the float settles thereon.

A further object of the invention is to provide a casting device of this character embodying a float-supporting member to be thrown by hand out into a body of water and catapulting means carried by the device for casting the bait outwardly from the device after the float has settled on the water.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view;

Figure 3 is a longitudinal sectional view taken substantially on a line 3—3 of Figure 2;

Figure 4 is an enlarged transverse sectional view of the reel taken substantially on a line 4—4 of Figure 2;

Figure 5 is an enlarged fragmentary sectional view taken substantially on a line 5—5 of Figure 3; and Figure 6 is a perspective view of the weight actuated trip.

Referring now to the drawings in detail, wherein for the purpose of illustration I have disclosed a preferred embodiment of the invention, the numeral 5 designates a straight handle preferably of wood or other light weight material, having its front end secured between the rear end of a frame designated generally at 6 and which is composed of a pair of spaced parallel longitudinally extending frame members 7 secured to each other by bolts and nuts 8, one of said bolts and nuts having a pair of spacing sleeves 9 positioned thereon. The front and rear pairs of floats 10 and 11 of suitable material and shape are secured at the opposite sides of the frame 6 at the front and rear ends thereof.

A fishing line reel or spool 12 is rotatably supported between the frame members 7 at the front ends thereof on a bolt and nut 13 and on which one end of a line 14 is secured for winding on the reel, the other end of the line being attached to an artificial bait 15.

The bait 15 is supported on a cradle 16 at the rear end of a catapult 17 pivoted intermediate its ends on one of the bolts and nuts 8 between the spacing sleeves 9. The cradle is formed with rearwardly inclined upwardly curved fingers 18 at its side edges to cradle the body of the bait 15 therein and the rear end of the cradle is forked as shown at 19 to engage the fish hooks 20 at the rear end of the bait.

To the front end of the catapult is suitably secured a spring finger 21 which has its free end bearing against one of the flanges of the spool 12 to serve as a brake therefor to hold the line 14 taut when wound on the reel and with a forward pulling force on the bait 15 to hold the same in the cradle 16.

An elastic band 22 has one end secured to the front end of catapult 17 and its rear end extended around the front end of handle 5 and secured thereto by a wire clamp 23.

A trip device 24 constructed of suitable strap material is bent to provide an open frame 25 at one end to accommodate the front end of catapult 17 and spring finger 21 and has its end portions bent toward each other in confronting relation and shaped to provide a hook 26 which is pivoted to the forward portion of the catapult by a transverse pin 27. The hook 26 is engageable with one of the bolts and nuts 8 carried by the frame member 6.

A fish line 28 extends through a longitudinal passage 29 in the rear portion of handle 5 and then forwardly under the handle for attaching around the front end of the handle as shown at 30.

A weight 31 is attached to front end of trip 24.

In the operation of the device the line 14 is wound on reel 12 and catapult 17 is secured in its set position by swinging the rear end thereof rearwardly to place the spring or elastic 22 under tension and the catapult is held in its set position by engaging the hook 26 of trip 24 over the bolt and nut 8 as shown in Figure 3 of the drawing. In this position the spring finger 21 at the front end of the catapult bears against one of the flanges of the reel 12 to thus hold the reel against idle rotation and to maintain the line 14 taut. The artificial bait 15 is then placed in cradle 16 and held therein by the hooks 20 engaging the fork at the rear end of the catapult.

The handle 5 is then grasped by the hand of a person and the device thrown outwardly into a body of water, the line 28 being paid out during this casting action or the device may be cast by a casting rod (not shown).

The float pins 10 and 11 are secured in a position with the center thereof slightly above the frame 6 so that when the device settles on the water the float will support the same with the trip 24 under the frame 6.

The weight 31 will then release the hook 26 of the trip from the bolt and nut 8 to thus release catapult 17 and elastic 22 will then swing the lower end of catapult 17 downwardly to free the spring finger 21 from reel 12 and to swing the upper end of catapult carrying the bait 15 forwardly into a position as shown by the dotted lines in Figure 3 and to cast the bait 15 away from the device. The bait 15 will then settle in the water below the surface thereof in the usual manner and when struck by a fish the line at 28 is reeled in by the fisherman to thus retrieve the casting device and to reel in the catch.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish line casting device comprising a buoyant member having a retrieving line attached thereto, a line reel carried by said buoyant member and holding a second line in a reeled-in position during casting of said member onto a body of water, and means carried by the buoyant member automatically releasing the reel for paying out the second line when the buoyant member settles on the water.

2. A fish line casting device comprising a buoyant member having a retrieving line attached thereto, a reel carried by said buoyant member and having a bait line attached thereto, and means carried by the buoyant member for casting the bait line.

3. A fish line casting device comprising a buoyant member having a retrieving line attached thereto, a reel carried by said buoyant member and having a bait line attached thereto, means carried by the buoyant member for casting the bait line, a trip device holding the casting means inactive, and means automatically releasing the trip device upon settling of the buoyant member on the water.

4. A fish line casting device comprising a buoyant member having a retrieving line attached thereto, a reel carried by said buoyant member and having a bait line attached thereto, and means carried by the buoyant member for casting the bait line, said last named means comprising a catapult for the bait of the bait line, and trip controlled operating mechanism for said catapult.

5. A fish line casting device comprising a buoyant member having a retrieving line attached thereto, a reel carried by said buoyant member and having a bait line attached thereto, and means carried by the buoyant member for casting the bait line, said last named means comprising a catapult for the bait of the bait line, a trip device for the catapult, and a weight releasing the trip upon settling of the buoyant member on the water.

6. A fish line casting device comprising a buoyant member having a retrieving line attached thereto, a reel carried by said buoyant member and having a bait line attached thereto, and means carried by the buoyant member for casting the bait line, said last named means comprising a catapult for the bait of the bait line, a brake for the reel carried by the catapult, a trip device simultaneously releasing the catapult and the brake, and means automatically moving the trip device into its releasing position upon settling of the buoyant member on the water.

7. A fish line casting device comprising a buoyant member having a retrieving line attached thereto, a reel carried by said buoyant member and having a bait line attached thereto, and means carried by the buoyant member for casting the bait line, said last named means comprising a mechanically operated catapult for the bait of the bait line, a brake for the reel carried by the catapult, a trip device simultaneously releasing the catapult and the brake, and gravity actuated means automatically moving the trip device into its releasing position upon settling of the buoyant member on the water.

FLOYD GILBERT NICHOLSON.

REFERENCES CITED

The following references are of record in the file of this patent:

UNITED STATES PATENTS

| Number | Name | Date |
| --- | --- | --- |
| 1,241,707 | Capooch et al. | Oct. 2, 1917 |